March 29, 1949.  F. R. SHONKA  2,465,938
RADIATION MEASURING DEVICE
Filed Nov. 21, 1946
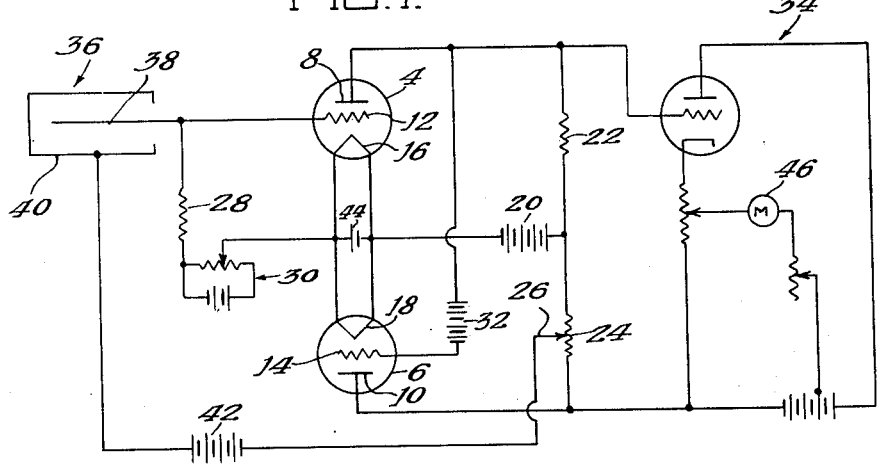
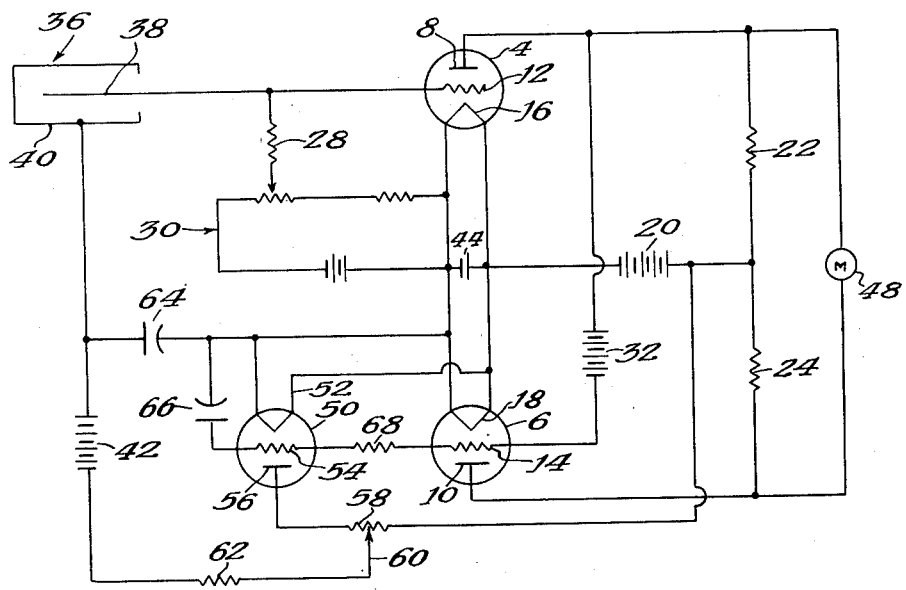
INVENTOR.
Francis R. Shonka
BY
Robert A. Lavender
Attorney Patented Mar. 29, 1949

2,465,938

UNITED STATES PATENT OFFICE 2,465,938

RADIATION MEASURING DEVICE

Francis R. Shonka, Chicago, Ill., assignor to the United States of America as represented by the United States Atomic Energy Commission Application November 21, 1946, Serial No. 711,432

10 Claims. (Cl. 250—83.6)

This invention relates to an improved ionization chamber instrument for the measurement of particles and radiations emanating from radioactive materials. More specifically, the invention relates to an improvement which decreases the response time of the instrument.

As is well known in the art, a common device for measuring radioactivity is an ionization chamber. The ionization chamber is commonly connected in series with a voltage supply and a resistance. The ions induced by an ionizing particle, such as an alpha particle or a beta particle, are collected by the electrodes of the ionization chamber. Such collection of charge constitutes a current through the series circuit which causes a voltage drop across the resistance. By measuring the voltage drop against the resistance, one may obtain a measurement of the amount of ionization occuring within the chamber, and thus of the intensity of the radioactivity to which the chamber is exposed. In such a device, the amount of current flowing through the circuit above described is not dependent upon the magnitude of the resistance, but is controlled solely by the ionization chamber. Thus, it is possible by increasing the size of the resistance to induce appreciable voltages across the resistance in measuring radiation fields of low intensity.

A difficulty that is commonly experienced in increasing the sensitivity of the instrument by increasing the size of the resistance in series with the chamber is that in the past such a design has been accompanied by a corresponding increase in the response time of the instrument upon variation of the radioactive field to which the chamber is exposed. This difficulty arises because in the circuit described above, the sum of the voltage across the resistance and the voltage across the ionization chamber is constant. Therefore, when the ionization chamber is exposed to a rapidly increasing field, the voltage across the chamber must decrease at the same time the voltage across the resistance increases. As is well known in the art, the time for such a system to respond to a rapid change in the conditions under measurement is controlled by the product of the capacitance of the chamber and the value of the series resistance, this product being known as the "time-constant" of the system.

Upon an abrupt change in the conditions to which the system is responsive, the system approaches equilibrium or steady-state conditions in asymptotic fashion. In order that a measurement of the voltage across the resistance constitute a measure of the radioactivity whose intensity is sought, it is, of course, necessary that such equilibrium be reached before the reading constituting the voltage measurement is taken. As is well known in the art, the time at which the measurement is taken after such an abrupt change must be not less than approximately 5 time-constants. A typical ionization chamber has a capacity of the order of magnitude of, for example, 25 micro-microfarads ($2.5 \times 10^{-11}$ farads). It is common in sensitive measurements to use a resistance of the order of $10^{12}$ ohms. Since in the exemplary case given, the time constant would be 25 seconds, a system so designed would in the past require a time of the order of 2 minutes before a reading could be taken.

It is common in such a device to employ a direct current amplifier to which the input is the voltage across the resistance and whose output is measured in a microammeter or a vacuum tube voltmeter. Portable instruments containing such systems are well known. It will readily be seen that the long time of response mentioned above is a serious defect in the systems heretofore used for sensitive measurements, particularly in the case of portable instruments, wherein it is desired that a measurement be made as rapidly as possible. This is particularly true in instruments to be used for survey purposes in discovering radioactive contamination in such places as laboratories, where it is obviously necessary that the device respond quickly in order that the ionization chamber may be moved rapidly past suspected areas with assurance that the contamination will not be missed.

It is an object of this invention to provide an ionization chamber circuit having a short response time.

It is a further object of this invention to provide a means and method for shortening the response time of an ionization chamber circuit.

It is a further object of this invention to provide an ionization chamber circuit in which the response time is not governed by the time constant of the capacity of the ionization chamber and the resistance in series with the ionization chamber.

Generally, the objects of this invention are accomplished by varying the voltage supply which is, as aforesaid, in series with the ionization chamber and the resistance. The variation is such as to maintain the voltage appearing across the ionization chamber substantially constant under all conditions, so that the capacitance of the ionization chamber is not required to charge and discharge through the high resistance in series therewith.

For a complete understanding of the teachings of the invention, reference is made to the drawings, in which:

Fig. 1 is a schematic electrical diagram of an ionization chamber circuit and associated direct current amplifier and vacuum tube voltmeter, constituting a device for the measurement of radioactivity incorporating the teachings of this invention;

Fig. 2 is a schematic electrical diagram of an ionization chamber, a balanced pair direct current amplifier, and an auxiliary tube for the purposes described below, which likewise constitute an instrument for the measurement of radioactivity incorporating the teachings of this invention.

Referring first to Figure 1, the vacuum tubes 4 and 6 are triode vacuum tubes having plates 8 and 10, grids 12 and 14, and filamentary cathodes 16 and 18. Each of the plates 8 and 10 is connected to the positive terminal of the plate voltage supply 20, the plate 8 being so connected through a plate load resistance 22, and the plate 10 being so connected through a plate load resistance 24 having thereon a tap 26. The negative terminal of the plate voltage supply 20 is connected in the conventional manner to the cathodes 16 and 18, which are directly connected together. The grid 12 is connected to the cathode 16 through a high resistance 28 and a variable grid bias supply 30. Thus, in the absence of current through the high resistance 28, the grid 12 is biased negative with respect to the cathode 16 by the bias value provided by the variable bias supply 30. The plate 8 of tube 4 is connected to the grid 14 of tube 6 through a biasing voltage supply 32.

As is well known in the art when the grid 12 is at its bias potential with respect to the cathode 16, the plate 8 will assume a fixed potential with respect to the cathodes. The value of the bias voltage supply 32 is such that in the absence of current through the high resistance 28, grids 12 and 14 are at the same potential. The plate load resistances 22 and 24 are of the same value. Therefore, if the tubes 4 and 6 are matched as to characteristics, the voltages across the load resistance 22 and 24 will, in the absence of current in the resistance 28, be the same. Thus, the potential between the plates 8 and 10 will be zero. Such an arrangement is known as a balanced pair direct current amplifier.

The voltage output between the plates 8 and 10 is measured by a conventional electronic voltmeter generally designated as 34, such voltmeters being very well known in the art.

An ionization chamber 36 has a central electrode 38 connected to the grid 12 of the input tube 4 of the balanced pair amplifier. The outer electrode 40 of the ionization chamber 36 is connected to the positive terminal of a voltage supply 42, of which the negative terminal is connected to the variable tap 26 on the resistance 24. It will thus be seen that there is a series ionization chamber circuit consisting of the ionization chamber 36, the high resistance 28, and an ionization chamber voltage supply. The ionization chamber voltage supply consists of the sum of the plate voltage supply 20 and the voltage supply 42 less the voltage appearing across the tapped portion of the resistance 24. (The voltages of a filament supply battery 44 and the grid bias supply 30 may be neglected for purposes of this explanation because they are small compared to the other voltage supplies. Likewise as regards the series ionization chamber circuit described, all resistances other than the high resistance 28 may be neglected because they are not of the same order of magnitude as the high resistance 28.)

Having thus described the structure of the device illustrated in Figure 1, its operation and advantages may now be explained. When radioactive emanations, such as alpha particles, cause ionization within the ionization chamber 36, a current flows through the high resistance 28, thus making the grid 12 of the input tube 4 less negative with respect to the cathode 16. Because of the increased voltage drop in the plate load resistance 22, the plate 8 becomes less positive with respect to the cathode 16, and, therefore, the grid 14 of the balancing tube 6 becomes more negative with respect to the cathode 18, thus causing a decrease in voltage across the resistance 24. Since, as explained above, a portion of the voltage across the resistance 24 is subtracted from the voltage supply for the ionization chamber circuit including the ionization chamber 36 and the high resistance 28, the voltage applied to this circuit is thereby increased. Persons skilled in the art will readily understand that small increases or decreases in the voltage supply will not affect the current through the ionization chamber at any given value of incident radioactivity. Thus the introduction of such a variable voltage supply does not affect the steady-state operation of the device, but only the speed of its response to changes.

The tap 26 may be adjusted so that the amount of the increase of the ionization chamber circuit's voltage supply is equal to any voltage appearing across the high resistance 28, for all values of ionization current. In such a case, all of the increase in voltage then appears between the electrodes 38 and 40. Since the potential across the ionization chamber 36 thus remains constant for any two steady-state values of the incident radioactivity, it is not necessary to charge and discharge the capacitance of the chamber 36 through the high resistance 28. Thus, the slow response characterizing previous systems, which required a change in the charge of the chamber capacitance, is eliminated. The meter 46 of the vacuum tube voltmeter 34 will respond to variations of the radioactivity to which the chamber 36 is exposed at a speed not dependent on the capacity of the chamber 36.

In the system illustrated in Figure 2, the measurement of the potential appearing between plates 8 and 10 which, as above stated, constitutes a measurement of the radioactivity, is made directly, with a microammeter 48 connected between said plates 8 and 10. As is well known in the art, the microammeter 48 has a relatively low resistance, of the order of 2,000 ohms or less, and, therefore, greatly reduces the amount of voltage change across the resistance 24 occasioned by any given change in voltage across the high resistance 28. Therefore, there is inserted a supplementary vacuum tube 50 having a filamentary cathode 52 connected to the cathodes 16 and 18, a grid 54 at the potential of the grid 14 of vacuum tube 6, and a plate 56 connected to the positive terminal of the voltage supply 20 through a plate load resistance 58. A tap 60 on the resistance 58 is connected to the positive terminal of the voltage supply 42 through a resistance 62.

It will be seen that this circuit is very similar in operation to that of Fig. 1. However, the voltage subtracting from the sum of the voltage supplies 42 and 20 is, in this case, the voltage across a portion of the plate load resistance 58 of the added tube 50 instead of the voltage across a portion of the plate load resistance 24 of the balancing tube 6, as in Fig. 1. The tube 50 serves as a direct current amplifier of the voltage appearing at the plate 8, the voltage between the tap 60 and the positive terminal of the power supply 20 being in series with the ionization chamber 36 and the high resistance 28. The tube 50 thus constitutes means for varying the voltage supplied to these two last-mentioned elements.

A condenser 64 is connected from the positive terminal of the voltage supply 42 to the cathode 52. A condenser 66 is connected from the grid 54 to the cathode 52, and the grid 54 is isolated from the grid 14 by a resistance 68. It has been found that the occurrence of oscillations is minimized by the use, as illustrated in Figure 2, of condensers 64 and 66 and resistors 62 and 68.

Adjustment of the tap 26 in Fig. 1, or the tap 60 in Fig. 2, is preferably made so that the increase in voltage supplied to the chamber 26 and the high resistance 28 is substantially equal to the increase of voltage appearing across the high resistance 28 as the result of change of current through the ionization chamber 36. If the adjustment is made so that such change in voltage is less than the required amount, the effective capacitance of the chamber 36 will still be reduced, but will not be completely eliminated. On the other hand, if the tap 26 or 60 is adjusted so that the change in voltage applied to the chamber 36 and the high resistance 28 is greater than the steady-state voltage change across the high resistance 28, the capacitance of the chamber 36 is overcompensated. In such a case, upon an abrupt change of radioactive field conditions, the meter 46 or 48 may overshoot the proper reading before reaching equilibrium.

Examples of the components which may be used in the illustrative embodiments of the drawing are: Tubes 4 and 6 are preferably triode electrometer tubes, for example, V-32's. Load resistors 22 and 24 are, for example, 40,000 ohms. The plate voltage supply 20 may be 22.5 volts. The grid bias supply 30 may be 3 volts and the bias voltage supply 32 may be 15 volts. The voltage supply 42, will, of course, as is well known in the art, depend in value on the particular design of the ionization chamber 36 employed, the illustrative embodiments of the drawing being useful with a large variety of ionization chambers requiring a correspondingly large variety of voltages. It will readily be understood that the value of the voltage supply 42 should be selected so that the sum of the values of supplies 42 and 20 provide proper operation of the ionization chamber 36. Such values will readily be selected for particular ionization chambers 36 by persons familiar with the operation of ionization chambers.

Any standard design well known in the art may be used for the vacuum tube voltmeter 34 of Fig. 1. The meter 48 of Fig. 2 may have a full scale value of, for example, 20 microamperes. The tube 50 may be a triode-connected tetrode, such as V-124; the condensers 64 and 66 may be 0.05 microfarad; the resistors 62 and 68 may be 5 megohms; and the resistance 58 may be 500,000 ohms.

Many equivalent methods and means other than those illustrated in the drawing and described above will readily be devised by persons skilled in the art, and the invention accordingly is not limited to the method and means described and illustrated herein.

What is claimed is:

1. Apparatus for the measurement of particles and radiations comprising, in combination, an ionization chamber circuit having a voltage supply, a direct-current amplifier having an input circuit connected to said ionization chamber circuit and having an output circuit adapted to produce an output voltage varying with the amount of ionization occurring in said ionization chamber, at least a portion of said output voltage constituting at least a portion of said voltage supply.

2. A method of decreasing the response time of an ionization chamber circuit comprising in series, an ionization chamber, a voltage supply, and an electrical impedance adapted to develop a voltage proportional to the ionization occurring in said chamber, said method comprising the step of increasing the voltage value of said voltage supply by an amount approximately the same as the voltage change across said impedance element, so that the voltage across the ionization chamber remains substantially constant.

3. A method of reducing the response time of an ionization chamber circuit having, in series, an ionization chamber, a voltage supply, and an impedance adapted to produce a voltage proportional to the current in said ionization chamber, said method comprising the step of changing the value of the voltage supply by an amount equal to at least a portion of any voltage change across said impedance, so that the voltage change across the ionization chamber is less than that across said impedance.

4. Radiation measuring apparatus comprising, in combination, an ionization chamber, a voltage supply, an impedance adapted to produce a voltage proportional to the current in said ionization chamber, said chamber, supply, and impedance being connected in series, and means responsive to a change in voltage across said impedance for changing the voltage of said voltage supply a substantially equal amount, so that the voltage across said ionization chamber remains substantially constant.

5. Apparatus for the measurement of particles and radiations comprising, in combination, an ionization chamber, a voltage supply, an electrical resistance, a direct-current electronic amplifier having a cathode, an anode, a control electrode and an anode load impedance, means for connecting said resistance between said cathode and said control electrode, means for connecting said ionization chamber and said voltage supply in series with said resistance, and means responsive to a change of potential of said anode for varying the voltage of said voltage supply.

6. Apparatus for the measurement of particles and radiations comprising, in combination, an ionization chamber, a fixed voltage supply, and a chamber-circuit resistance, said chamber, supply, and resistance being connected in series, a balanced pair direct-current amplifier having an input electronic tube and a balancing electronic tube, each having an anode, a cathode, a control electrode, and an anode load resistor, means for connecting said chamber-circuit resistance between the cathode and control electrode of said input electronic tube, means for inverting the phase of changes in potential occurring at the anode of said input electronic tube, and means for impressing at least a portion of said phase-inverted changes in potential in series with said chamber, supply and resistance.

7. Apparatus for the measurment of particles and radiations comprising, in combination, an ionization chamber, a voltage supply, and a chamber-circuit resistance, said chamber, supply and resistance being connected in series, a balanced pair direct-current amplifier having an input electronic tube and a balancing electronic tube, each having a cathode, an anode, a control electrode, and an anode load resistor, means for connecting said chamber-circuit resistance between the cathode and control electrode of said input electronic tube, means responsive to changes in potential of the anode of said input electronic tube for varying the voltage value of said voltage supply, and means for measuring the difference in potential between the anodes of said input electronic tube and said balancing electronic tube.

8. The apparatus of claim 7 wherein said means responsive to changes in potential of said anode comprises at least a portion of the anode load resistor of the balancing electronic tube, said portion being connected in series with said chamber and chamber-circuit resistance.

9. The apparatus of claim 7, wherein said means responsive to changes in potential of said anode comprises a third electronic tube having a cathode, an anode, and a control electrode, means for causing the potential of said last-mentioned control electrode to vary in accordance with the variation of potential of the anode of the input electronic tube, an anode load resistor for said third electronic tube, and means for connecting the potential appearing between the cathode and anode of said third electronic tube in series with said chamber and chamber-circuit resistance.

10. Radiation measuring apparatus comprising, in combination, an ionization chamber, a voltage supply, an impedance adapted to produce a voltage proportional to the current in said ionization chamber, said chamber, supply, and impedance being connected in series, and means responsive to a change in voltage across said impedance for changing the voltage of said voltage supply.

FRANCIS R. SHONKA.

REFERENCES CITED

The following references are of record in the file of this patent:

UNITED STATES PATENTS

| Number | Name | Date |
|---|---|---|
| 2,219,274 | Sherbatskoy | Oct. 22, 1940 |